(12) United States Patent
Holtslander

(10) Patent No.: US 9,440,865 B2
(45) Date of Patent: Sep. 13, 2016

(54) METHOD FOR USING AN OIL ABSORBING ARTICLE

(71) Applicant: PAC, Inc., La Crosse, WI (US)

(72) Inventor: John Holtslander, La Crosse, WI (US)

(73) Assignee: PAC, Inc., La Crosse, WI (US)

( * ) Notice: Subject to any disclaimer, the term of this patent is extended or adjusted under 35 U.S.C. 154(b) by 239 days.

(21) Appl. No.: 14/451,578

(22) Filed: Aug. 5, 2014

(65) Prior Publication Data

US 2014/0346116 A1 Nov. 27, 2014

Related U.S. Application Data

(62) Division of application No. 13/239,443, filed on Sep. 22, 2011, now abandoned.

(60) Provisional application No. 61/415,377, filed on Nov. 19, 2010.

(51) Int. Cl.
| | |
|---|---|
| *C02F 1/28* | (2006.01) |
| *B01J 20/26* | (2006.01) |
| *C09K 3/32* | (2006.01) |
| *B01J 20/28* | (2006.01) |

(Continued)

(52) U.S. Cl.
CPC .............. *C02F 1/285* (2013.01); *B01J 20/261* (2013.01); *B01J 20/262* (2013.01); *B01J 20/264* (2013.01); *B01J 20/2805* (2013.01); *C09K 3/32* (2013.01); *A23L 3/04* (2013.01); *B01J 2220/445* (2013.01); *C02F 1/40* (2013.01); *C02F 2101/32* (2013.01); *C02F 2103/001* (2013.01); *C02F 2103/008* (2013.01); *C02F 2103/023* (2013.01); *C02F 2103/32* (2013.01); *C02F 2103/42* (2013.01); *C02F 2201/002* (2013.01); *C02F 2201/008* (2013.01)

(58) Field of Classification Search
CPC ...... C02F 1/285; C02F 1/40; C02F 2103/32; A23L 3/04; A23L 4/045
See application file for complete search history.

(56) References Cited

U.S. PATENT DOCUMENTS 2,571,457 A * 10/1951 Ladisch ................. C03B 37/06
264/12
2,634,208 A 4/1953 Miscall et al.

(Continued)

OTHER PUBLICATIONS

Dyneon, "Material Safety Data Sheet for HISORB 1151" (Jul. 22, 2008), pp. 1-7.

(Continued)

*Primary Examiner* — Matthew O Savage
(74) *Attorney, Agent, or Firm* — Eric W. Guttag; Eric W. Guttag IP Law Office

(57) ABSTRACT

An oil absorbing article which includes an oil absorbent material which is stable against melting at a temperature of at least about 100° F. in an aqueous environment; a receptacle for holding the oil absorbent material having a porous material which is stable against melting at a temperature of at least about 100° F. in an aqueous environment and which permits the passage of water and oil components through the receptacle; and a flexible handle attached to the receptacle for hanging the oil absorbent article in the aqueous environment. Also, a method for using the oil absorbing article by placing the article in an aqueous environment having a temperature of at least about 100° F. and which is contaminated with oil components for a period of time sufficient to remove at least a portion of the oil components.

15 Claims, 2 Drawing Sheets

(51) Int. Cl.
*A23L 3/04* (2006.01)
*C02F 1/40* (2006.01)
*C02F 101/32* (2006.01)
*C02F 103/00* (2006.01)
*C02F 103/02* (2006.01)
*C02F 103/32* (2006.01)
*C02F 103/42* (2006.01)

(56) References Cited

U.S. PATENT DOCUMENTS

| | | | |
|---|---|---|---|
| 3,231,639 A * | 1/1966 | Mabru | D01D 5/08 |
| | | | 264/12 |
| 3,518,183 A | 6/1970 | Evans | |
| 3,622,357 A * | 11/1971 | Tillman | C12H 1/18 |
| | | | 426/238 |
| 3,764,527 A * | 10/1973 | Sohl | B01D 17/0202 |
| | | | 210/671 |
| 4,011,175 A | 3/1977 | Preus | |
| 4,111,813 A | 9/1978 | Preus | |
| 4,838,947 A * | 6/1989 | Levy | B01J 20/24 |
| | | | 134/7 |
| 5,104,548 A | 4/1992 | Gabrick | |
| 5,186,831 A | 2/1993 | DePetris | |
| 5,718,015 A | 2/1998 | Rohrbacher | |
| 6,056,805 A | 5/2000 | Litwin et al. | |
| 6,541,569 B1 | 4/2003 | Morris et al. | |
| 6,582,608 B1 | 6/2003 | Miller | |
| 7,771,633 B2 | 8/2010 | Burns et al. | |
| 8,722,592 B2 | 5/2014 | Matulewicz et al. | |
| 2007/0102346 A1 * | 5/2007 | Cordani | A47J 43/284 |
| | | | 210/483 |
| 2009/0274920 A1 | 11/2009 | Li et al. | |
| 2010/0022424 A1 | 1/2010 | Vogt et al. | |

OTHER PUBLICATIONS

Phifer Inc., "Material Safety Data Sheet for PhiFerTex® polyvinyl chloride (PVC) vinyl coated polyester mesh materials" (Jan. 2007), pp. 1-5.
UltraTech International, Inc., "Material Safety Data Sheet for Ultra-X-Tex® fabric made from recycled synthetic fibers" (Aug. 15, 2001), pp. 1-2.
Whiting et al, The Suitability of a Variety of Particulate Sorbents as Spill Response Tools [online]. California Department of Fish and Wildlife, Jul. 2009.
SSEP Reports and Publications [online], California Department of Fish and Wildlife, Jun. 4, 2013.

* cited by examiner

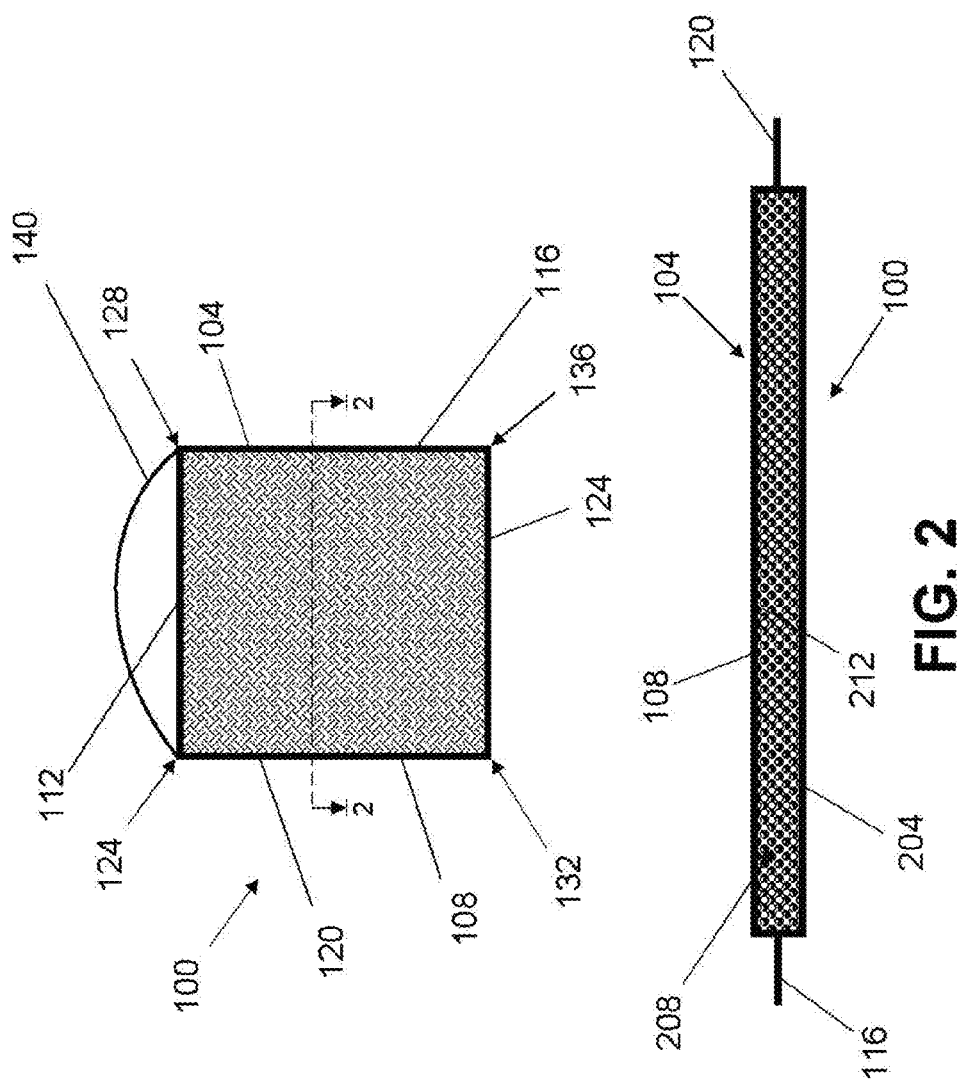

METHOD FOR USING AN OIL ABSORBING ARTICLE

CROSS-REFERENCE TO RELATED APPLICATIONS

This application is a divisional of U.S. Non-Provisional Application No. 13/239,443, filed Sep. 22, 2011, which makes reference to and claims the priority benefit of the following co-pending U.S. Provisional Patent Application No. 61/415,377, filed Nov. 19, 2010. The entire disclosure and contents of the foregoing Provisional Application is hereby incorporated by reference.

FIELD OF THE INVENTION

The present invention broadly relates to oil absorbing article. The present invention also broadly relates to a method for using this oil absorbing article to remove oil from a relatively warm or hot aqueous environment.

BACKGROUND

Previously, water was a relatively inexpensive resource. But in recent years as water resources have become scarcer and overused, the importance of recycling and reusing water present in various water systems has increased. These water systems may include warm (e.g., above about 100° F.) or hot (e.g., above about 150° F.) water systems such as collection tanks for warmers, pasteurizers, cooling tunnels, etc., used in packaging beverages and food products, hot tubs, swimming pools, etc. In some instances these hot water systems may reach temperatures as high as the boiling point of water (e.g., about 212° F. or 100° C.)

These warm or hot water systems may also become contaminated with oil components from various sources. For example, these oil components may be petroleum-based sources (e.g., hydrocarbons such as oil, grease, lubricants, etc.). may be from plant or animal sources, such as fats and oils comprising edible triglycerides, may be human skin oils, etc. In order to continually reuse, the water in these warm or hot aqueous environments, these contaminating oil components may need to be removed at least periodically.

SUMMARY

According to a first broad aspect of the present invention, there is provided an product comprising an oil absorbing article comprising:
  an oil absorbent material which is stable against melting at a temperature of at least about 100° F. in an aqueous environment;
  a receptacle for holding the oil absorbent material comprising a porous material which is stable against melting at a temperature of at least about 100° F. in an aqueous environment and which permits the, passage of water and oil components through the receptacle; and
  a flexible handle attached to the receptacle for hanging the oil absorbent article in the aqueous environment.

According to a second broad aspect of the present invention, there is provided a method for removing contaminating oil components from an aqueous environment having a temperature of at least about 100° F., comprising the following steps:
  a. providing an oil absorbent article comprising:
    an oil absorbent material which is stable against melting at a temperature of at least about 100° F. in an aqueous environment;
    a receptacle for holding the oil absorbent material comprising a porous material which is stable against melting at a temperature of at least about 100° F. in an aqueous environment and which permits the passage of water and oil components through the receptacle; and
    a flexible handle attached to the receptacle for hanging the oil absorbent article in the aqueous environment; and
  b. placing the oil absorbent article in an, aqueous environment having temperature of at least about 100° F. and which is contaminated with oil components for a period of time sufficient to remove at least a portion of the oil components.

BRIEF DESCRIPTION OF THE DRAWINGS

The invention will be described in conjunction with the accompanying drawings, in which:

FIG. 1 is a frontal perspective view an embodiment of an oil absorbing article of the present invention;

FIG. 2 is side sectional view of the embodiment of the oil absorbing article of FIG. 1 taken along line 2-2.

DETAILED DESCRIPTION

Figure 3:
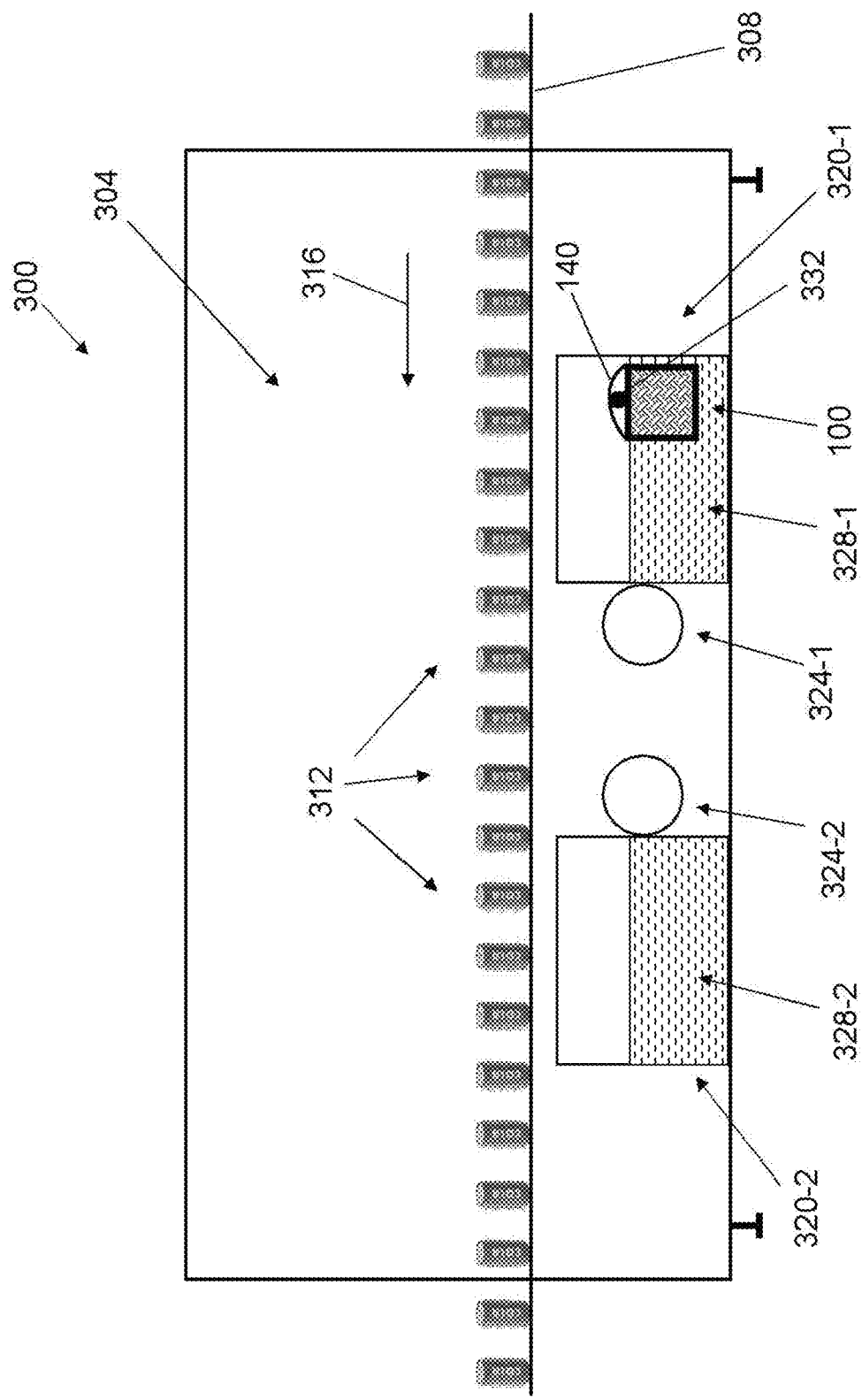
FIG. 3 is a schematic diagram of a warmer or pasteurization system for beverage products which shows an embodiment of an oil, absorbing sponge in use for removing contaminating oil components from a water collection tank.

It is advantageous to define several terms before describing the invention. It should be appreciated that the following definitions are used throughout this application.

Definitions

Where the definition of terms departs from the commonly used meaning of the term, applicant intends to utilize the definitions provided below. unless specifically indicated.

For the purposes of the present invention, directional terms such as "outer," "inner," "upper," "lower," "top", "bottom", "side," "front," "frontal," "forward," "rear," "rearward," "back," "trailing," "above", "below", "left", "right", "horizontal", "vertical", "upward", "downward", etc. are merely used for convenience in describing the various embodiments of the present invention. For example, the embodiments shown in FIGS. 1 through 3 may be flipped over, rotated by 90° in any direction, etc.

For the purposes of the present invention, the term "oil absorbing material" refers to a material which is capable of absorbing, imbibing, etc., oil components from an aqueous environment at a temperature of at least about 100° F. The oil absorbing material may be in the form of a plurality of particles, spheres, beads, pellets, loose fibers, etc., or may be in the form of a unitary mass, such as a pad, sheet, block, wad, woven fibers, body, disc, piece, chunk, lump, clump, tablet, insert, aggregate, etc. Suitable oil absorbent materials may include, for example, melt blown polypropylene pads, melt blown polypropylene loose fibers, melt blown polypropylene particles, melt blown polypropylene loose pulp, wood particles, cellulosic fibers, particles, spheres, beads, pellets made from one or more of: styrene-butadiene copolymers, styrene-isoprene copolymers, styrene-butadiene-styrene block copolymers, styrene-isoprene-styrene block copolymers, styrene-butadiene-styrene/ethylene-propylene diene block copolymers, styrene-ethylene-propylene-styrene block copolymers, such as, for example, KRATON G series copolymers (e.g., polystyrene-poly(ethylene/butylene)-polystyrene copolymer) such as KRATON G-1650 or KRATON G-1651 or KRATON G-1652 made by Shell Chemical Company. See U.S. Pat. No. 3,518,183(Evans), issued Jun. 30, 1970; U.S. Pat. No. 6,344,519 (Rink et al.), Feb. 5, 2002; U.S. Pat. No. 4,941,978 (Gatwick), issued Jul. 17, 1990, the entire contents and disclosure of which are herein incorporated by reference. In some embodiments, suitable oil absorbent materials may include a blend, mixture, alloy, etc., of from about 55 to about 98% by weight of one or more elastomeric polystyrene-butadiene copolymers, polystyrene-butadiene-polystyrene triblock copolymers, polystyrene-isoprene-polystyrene triblock copolymers, polystyrene grafts of elastomers, etc.; from about 3 to about 45% by weight of one or more thermoplastic polystyrenes, polyolefins, etc.; and from about 0.01 to about 12% by weight of one or more fillers such as oxides and carbonates of magnesium and/or calcium, talc, silica, diatomaceous earth, etc., such as, for example, DYNEON™ HISORB 1151 sold in the form of pellets comprising 90-98% styrene-butadiene copolymer, 3-5% styrene-isoprene copolymer and up to 0.05% talc by Dyneon of Oakdale, Minn. See U.S. Pat. No. 6,582,608(Miller), issued Jun. 24, 2003, the entire contents and disclosure of which is herein incorporated by reference.

For the purposes of the present invention, the term "oil components" refers to lipophilic materials which are liquid at a temperature of at least about 100° F. Oil components which may include petroleum-based sources (e.g., hydrocarbons such as oil, grease, lubricants such as Necker lube, etc.), may be from plant or animal sources, such as fats and oils comprising edible triglycerides, may be human skin oils, etc.

For the purposes of the present invention, the term "receptacle" refers to any article which may be used to hold, contain, carry, etc., the oil absorbing material. Receptacles may include bags, sacks, carriers, containers, vessels, holders, packages, packets, envelopes, socks (e.g., sausage-shaped containers), etc. Receptacles may permanently enclose, contain, etc., the oil absorbing material (e.g., the oil absorbing material in the receptacle cannot be replenished) or the receptacle may be opened and reclosed to permit replenishing of the oil absorbent material.

For the purposes of the present invention, the term "liquid" refers to a non-gaseous fluid composition, compound, material, etc., which may be readily towable at the temperature of use (e.g., at a temperature of at least about 100° F.) with little or no tendency to disperse and with a relatively high compressibility.

For the purposes of the present invention, the term "aqueous environment" refers to a system, container, tank, reservoir, receptacle, bin, compartment, vat, tub, pool, etc., which contains water.

For the purposes of the present invention, the term "warm temperature" refers to a temperature of at least about 100° F.

For the purposes of the present invention, the term "hot temperature" refers to a temperature of at least about 150° F.

For the purposes of the present invention, the term "boiling temperature" refers to the commonly accepted, meaning of boiling temperature, i.e., a temperature of about 212° F. or 100° C.

For the purposes of the present invention, the term "stable against melting" means that the article, material, compound, substance, etc., exhibits no appreciable melting at the temperature of use.

For the purposes of the present invention, the term "porous material" with reference to the receptacle refers to a material which permits the passage of water and oil components freely therethrough. Porous materials may be woven (e.g., mesh), materials nonwoven materials, etc. Suitable porous materials for use herein may include woven or nonwoven natural fibers, woven or non woven synthetic fibers, etc. For example, suitable porous materials may include polyester mesh materials, propylene mesh materials, nylon mesh materials, polyethylene mesh materials, vinyl coated mesh materials, denier hex mesh materials, nylon hex mesh materials, polyester woven mosquito netting materials. PhiFerTex® polyvinyl chloride (PVC) vinyl coated polyester mesh materials, trampoline fabric, fiberglass weave mesh materials, nonwoven polyester materials, nonwoven polypropylene materials, nonwoven nylon materials, nonwoven polypropylene materials, etc., Ultra-X-Tex® fabric made from recycled synthetic fibers, etc.

For the purposes of the present invention, the term "period of time sufficient to remove at least a portion of the oil components" refers to a period of time where a measurable quantity (part or all) of the oil components are removed. Such a period of time may include, for example, at least about 30 minutes, at least about an hour, at least about 0.5days, at least about 1 day, at least about 1 week, etc.

Description

Removing contaminating oil components from warm (e.g., above about 100° F.) or hot (e.g., above about 150° F.) aqueous environments poses significantly more difficult issues compared to removal of such oil components from aqueous environments at room temperature. Materials which may be used to remove contaminating oil components from aqueous environment are often used at room or ambient temperatures. But such materials which are used to remove such contaminating oil components at room or ambient temperatures may melt in warm or hot aqueous environments, may dissolve or be degraded in such warm or hot aqueous environments, etc.

Embodiments of the oil absorbing article of the present invention are designed to be able to operate in such warm or hot aqueous environments, up to and including aqueous environments at boiling temperatures. These embodiments of the oil absorbing article of the present invention comprise: an oil absorbent material which is stable against melting at a temperature of at least about 100° F. (for example, at least about 150° F. and up to as high as about 212° F.) in an aqueous environment; a receptacle for holding the oil absorbent material comprising a porous material which is stable against melting at a temperature of at least about 100° F. (for example, at least about 150° F. and up to as high as about 212° F.) in an aqueous environment and which permits the passage of water and oil components through the receptacle; and a flexible handle attached to the receptacle for hanging the oil absorbent article in the aqueous environment.

Embodiments of the oil absorbing article of the present invention may comprise: an oil absorbent material which is stable against melting at a temperature of at least about 100° F. in an aqueous environment; a receptacle for holding the oil absorbent material comprising a porous material which is stable against melting at a temperature of at least about 100° F. in an aqueous environment and which permits the passage of water and oil components through the receptacle; and a flexible handle attached to the receptacle for hanging the oil absorbent article in the aqueous environment.

Embodiments of the oil absorbing article of the present invention are further illustrated in FIGS. 1 and 2. Referring to FIG. 1, the oil absorbing article is indicated generally as 100. Article 100 includes a receptacle which is exemplified in FIG. 1 as a bag 104 comprising a woven material such as woven polyester fibers. Bag 104 comprises a generally rectangular or square-shaped front panel 108; front panel 108 may have other shapes including circular-shapes, oval shapes, triangular shapes, etc. Front panel 108 includes an upper edge or seam 112, a pair of spaced apart and opposing side edges or seams 116 and 120, and a lower edge or seam 124 spaced apart from and opposing upper seam or edge 112. Front panel 108 also has an upper left corner 124, an upper right corner 128, a lower left corner 132 and a lower right corner 136. Edge or seam 112 is connected to edge or seam 116 at corner 128, and to edge or seam 120 at corner 124. Edge or seam 124 is connected to edge or seam 116 at corner 132, and to edge or seam 120 at corner 136. Article 100 is also provided with a flexible handle 140 which may be in the form of, for example, an elongated polyester thread. As shown in FIG. 1, the ends of handle 140 may be connected to bag 104 at corners 124 and 128, respectively, for example, by sewing the ends into bag 104 at corners 124 and 128.

Referring to FIG. 2, bag 104 of article 100 also includes a generally rectangular or square shaped back panel 204 which also corresponds at least generally in shape to front panel 108, and which is connected to front panel 108 at edge or seam 112 (not shown in FIG. 2), edge or seam 116, edge or seam 120, and edge or seam 124 (not shown in FIG. 2). As also shown in FIG. 2, article 100 also comprises an oil absorbent material which is illustrated in FIG. 2 in the form of a plurality of oil absorbent beads, spheres, pellets, etc., indicated generally as 208 which are positioned within the inner surface, indicated as 212, of bag 104.

Oil absorbing article 100 shown in FIGS. 1 and 2 may be prepared, for example, by taking a piece of porous (e.g., woven) material, folding it in half along and to form lower edge or seam 124, and thus front panel 108 and back panel 204, sealing (e.g., by sewing, melting, etc.) together front panel 108 and back panel 204 at respective side edges or seams 116 and 120, to form bag 104, filling bag 104 with oil absorbent material 208 through the opening formed at top edge or seam 112, and then sealing (e.g., by sewing, melting, etc.) top edge or seam 112 to form a completely sealed bag 104. After sealed bag 104 is formed, handle 140 may be attached at corners 124 and 128, for example, by sewing the ends of handle 140 at respective corners 124 and 128, as described above.

Embodiments of the present invention are also directed at methods for using the oil absorbing sponge of the present invention for removing contaminating oil components from an aqueous environment having a temperature of at least about 100° F. these methods comprise the following steps: (a) providing an oil absorbent article (according to the embodiments as described above); and (b) placing the oil absorbent article in an aqueous environment having a temperature of at least about 100° F. (for example, at least about 150° F. and up to as high as about 212° F.) and which is contaminated with oil components for a period of time sufficient to remove at least a portion of the oil components.

Some illustrative embodiments of uses of the oil absorbing article of the present invention may include the following: fluid collection tanks, side compartments, vats, tubs, etc., where, for example, filter screens, filer baskets, pump inlets, etc., may be located, etc., used in, for example, pasteurization, warmer, retort, cooling tunnel, etc., systems for beverage or food products, etc.; hot tubs, swimming pools, etc.; bilge water tanks, pumps, etc., which may be used in ships, etc., and which may be contaminated with oil components; outside aqueous (water) collection or storage tanks, reservoirs, basins, etc., such as a catch basin, etc., which may be contaminated with oil components, such as petroleum-based products, reactors, etc.

FIG. 3 is a schematic diagram representing an illustrative use of the embodiment of the oil absorbing article shown in FIGS. 1 and 2. FIG. 3 shows a warmer or pasteurization system for containers containing beverages or foods which is indicated generally as 300. System 300 has an interior pasteurization area indicated generally as 304. A moving conveyor belt indicated as 308 passes through interior pasteurization area 304 and conveys beverage products, indicated generally by arrows 312, into and out of pasteurization area 304 in the direction indicated by arrow 316.

As shown in FIG. 3, positioned within pasteurization area 304 are a pair fluid (e.g., water or aqueous liquid) collection tanks, indicated respectively as 320-1 and 320-2. Tanks 320-1 and 320-2 are also provided with respective side pumps 324-1 and 324-2 for pumping the collected fluid, indicated respectively as 328-1 and 328-2 back for reuse in the pasteurization process. Over time, collected fluid 328-1 and 328-2 becomes contaminated with oil components such as grease, lubricants such as Necker lub, etc., which builds up in concentration and needs to be removed from tanks 320-1 and 320-2. As shown in FIG. 3, an oil absorbing article 100 is positioned in the collected fluid 328-1 in tank 320-1. As further shown in FIG. 3, handle 140 is positioned over an article hanger, such as a peg, hook, bracket, etc., in tank 320-1 so that article 100 may hang in a relatively fixed and stationery position in tank 320-1 to absorb and remove contaminating oil components from collected fluid 328-1.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method comprising the following steps:
   a. providing an oil absorbent article comprising:
      an oil absorbent material which is stable against melting at a temperature of at least about 100° F. in an aqueous environment, the oil absorbent material comprising melt blown polypropylene pads melt blown polypropylene loose fibers, melt blown polypropylene particles melt blown polypropylene loose pulp or spheres, beads, or pellets made from styrene-butadiene copolymers, styrene-isoprene copolymers, styrene-butadiene-styrene block copolymers, styrene-isoprene-styrene block copolymers, styrene-butadiene-styrene/ethylene-propylene diene block copolymers, or styrene-ethylene-propylene-styrene block copolymers;
      a receptacle for holding the oil absorbent material comprising a porous material which is stable against melting at a temperature of at least about 100° F. in an aqueous liquid and which permits the passage of water and oil components through the receptacle; and
      a flexible handle attached to the receptacle for hanging the oil absorbent article in the aqueous liquid; and
   b. providing a pasteurization system for containers containing beverages or foods, wherein the pasteurization system comprises a conveyor belt and an aqueous liquid collection tank disposed below the conveyor belt, wherein the aqueous liquid collection tank has an article hanger and has a collected aqueous liquid therein, and wherein the collected aqueous liquid has a temperature of at least about 100° F. and is contaminated with oil components, and c. positioning the handle over the article hanger so that the article of step (a) may hang in a relatively fixed and stationary in the collected aqueous liquid for a period of time sufficient to remove at least a portion of the oil components.

2. The method of claim 1, wherein the receptacle of step (a) is a bag, sack, carrier, container, vessel, holder, package, packet envelope or sock.

3. The method of claim 2, wherein the receptacle of step (a) is a bag.

4. The method of claim 3, wherein the porous material of the receptacle of step (a) is a woven polyester mesh material, a woven propylene mesh material, woven nylon mesh material, a woven polyethylene mesh material, or a woven vinyl coated mesh material.

5. The method of claim 4, wherein the porous material of the receptacle of step (a) is a woven polyester mesh material.

6. The method of claim 1, wherein the oil absorbent material of step (a) comprises a plurality of particles spheres, beads, pellets, or loose fibers.

7. The method of claim 6, wherein the oil absorbent material of step (a) comprises a plurality of pellets.

8. The method of claim 7, wherein the oil absorbent material of step (a) comprises a plurality of pellets made from: styrene-butadiene copolymers; styrene-isoprene copolymers; styrene-butadiene-styrene block copolymers; styrene-isoprene-styrene block copolymers; styrene-butadiene-styrene/ethylene-propylene diene block copolymers; or styrene-ethylene-propylene-styrene block copolymers.

9. The method of claim 8, wherein the plurality of pellets of the oil absorbent article of step (a) are made from: styrene-butadiene copolymers; or styrene-isoprene copolymers.

10. The method of claim 7, wherein the plurality of pellets of the oil absorbent material of step (a) are made from about 55 to about 98% by weight of elastomeric polystyrene-butadiene copolymers; polystyrene-butadiene-polystyrene triblock copolymers; polystyrene-isoprene-polystyrene triblock copolymers, or polystyrene grafts of elastomers; from about 3 to about 45% by weight of thermoplastic polystyrenes or polyolefins; and from about 0.01 to about 12% by weight of one or more fillers which are oxides or carbonates of magnesium, oxides or carbonates of calcium, talc, silica, or diatomaceous earth.

11. The method of claim 1, wherein the receptacle of step (a) comprises a generally rectangular-shaped front panel and a generally rectangular shaped back panel, each of the front and back panels being sealed at an upper edge, at a pair of spaced apart and opposing side edges, and at a lower edge spaced apart from and opposing the upper edge, and wherein the oil absorbent material comprises a plurality of oil absorbent pellets made from: styrene-butadiene copolymers; styrene-isoprene copolymers; styrene-butadiene-styrene block copolymers; styrene-isoprene-styrene block copolymers; styrene-butadiene-styrene/ethylene-propylene diene block copolymers; or styrene-ethylene-propylene-styrene block copolymers.

12. The method of claim 1, wherein:

the oil absorbent material of step (a) comprises pellets comprising 90-98% styrene-butadiene copolymer and 3-5% styrene-isoprene copolymer; and the receptacle of step (a) comprises a bag, the bag comprising a porous woven mesh polyester and having a generally rectangular-shaped front panel and a generally rectangular-shaped back panel, each of the front and back panels being sealed at an upper edge, at a pair of spaced apart and opposing side edges, and at a lower edge spaced apart from and opposing the upper edge.

13. The method of claim 1, wherein the aqueous environment of step (b) has a temperature of at least about 150° F.

14. The method of claim 1, wherein the period of time in which step (b) is carried out is at least about 30 minutes.

15. The method of claim 14, wherein the period of time in which step (b) is carried out is at least about 1 day.

* * * * *